(12) United States Patent
Chen et al.

(10) Patent No.: US 11,649,397 B1
(45) Date of Patent: May 16, 2023

(54) POLYAROMATIC HYDROCARBON-BASED HOST-GUEST COMPLEX FOR HEAVY CRUDE OIL VISCOSITY REDUCTION

(71) Applicant: Saudi Arabian Oil Company, Dhahran (SA)

(72) Inventors: Shaohua Chen, Beijing (CN); Ming Han, Dhahran (SA); Abdulkareem AlSofi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/875,203

(22) Filed: Jul. 27, 2022

(51) Int. Cl.
    *C09K 8/588* (2006.01)
    *C08G 65/331* (2006.01)
    *C08L 33/26* (2006.01)
    *C08L 71/02* (2006.01)
    *C08F 220/56* (2006.01)

(52) U.S. Cl.
    CPC ............ *C09K 8/588* (2013.01); *C08F 220/56* (2013.01); *C08G 65/3315* (2013.01); *C08L 33/26* (2013.01); *C08L 71/02* (2013.01)

(58) Field of Classification Search
None
See application file for complete search history.

(56) References Cited

U.S. PATENT DOCUMENTS

| | | | | |
|---|---|---|---|---|
| 6,827,939 | B2 * | 12/2004 | Fujii | ................ C07K 14/005 530/300 |
| 10,053,641 | B2 | 8/2018 | Bello | |
| 2007/0295640 | A1 | 12/2007 | Tan et al. | |
| 2014/0260466 | A1 * | 9/2014 | Rehage | ................ C11D 7/5004 252/88.1 |
| 2014/0271928 | A1 * | 9/2014 | Rehage | ................ A61K 8/9794 424/680 |
| 2020/0199441 | A1 | 6/2020 | Sun et al. | |
| 2020/0199442 | A1 * | 6/2020 | Zhang | ................ C08F 220/34 |

FOREIGN PATENT DOCUMENTS

FR         2904534 A1 * 2/2008 ............... A61K 8/86

OTHER PUBLICATIONS

Chavez-Miyauchi et al., "Aromatic Polyisobutylene Succinimides as Viscosity Reducers with Asphaltene Dispersion Capability for Heavy and Extra-Heavy Crude Oils," Energy & Fuels, Feb. 2013, 27(4):1994-2001, 8 pages.

Derakhshesh et al., "Occlusion of Polyaromatic Compounds in Asphaltene Precipitates Suggests Porous Nanoaggregates," Energy & Fuels, Oct. 2012, 27(4):1748-1751, 4 pages.

Yang et al., "A New Composite Viscosity Reducer with both Asphaltene Dispersion and Emulsifying Capability for Heavy and Ultra-Heavy Crude Oils," Energy & Fuels, Jan. 2017, 31(2):1195-1173, 15 pages.

\* cited by examiner

*Primary Examiner* — John J Figueroa
(74) *Attorney, Agent, or Firm* — Fish & Richardson P.C.

(57) ABSTRACT

This disclosure relates to water-soluble viscosity reducer complexes for use in reducing the viscosity of heavy oil in oil recovery operations. The viscosity reducer complexes contain a hydrophilic component of polyaromatic-hydrocarbon-based polymers and a hydrophilic component of cyclodextrin-based polymers.

24 Claims, 11 Drawing Sheets

POLYAROMATIC HYDROCARBON-BASED HOST-GUEST COMPLEX FOR HEAVY CRUDE OIL VISCOSITY REDUCTION

TECHNICAL FIELD

This document relates to a water-soluble viscosity reducer complex. The viscosity reducer complex can be used in oil recovery applications, such as where a waterflooding infrastructure is present.

BACKGROUND

Waterflooding is an example of a secondary recovery technique used to recover oil in different types of formations, where an aqueous solution is injected through an injection well in order to drive the oil to the production well where it can be produced. However, although waterflooding is used to drive normal heavy oil, the associated recovery is only 5%-25% due to its higher viscosity. In order to efficiently produce heavy crude oil, the viscosity of the oil must be substantially reduced. Transportation of heavy crude oil, such as by pipeline, can also be difficult to accomplish in an efficient manner unless the viscosity of the oil is first reduced. The chemicals that reduce heavy oil viscosity are typically pour point depressants (PPD) and viscosity reducing agents (VRA). PPDs are oil-soluble chemicals which can destroy the wax crystallization in crude oil (such as alkylnaphthalenes, polyolefins, and polyacrylates), while VRAs become water-soluble by forming stable and low-viscosity oil-in-water (O/W) emulsions with heavy crude oil. Unfortunately, the techniques utilized to facilitate recovery of heavy oil from subterranean formations are often not very successful and are costly. Accordingly, there is a need for improved methods for treating heavy crude oil produced from a petroleum reservoir whereby the viscosity of the oil can be substantially reduced and the oil can be produced and transported for further processing in an economical and efficient manner.

SUMMARY

Provided in the present disclosure is a water-soluble viscosity reducer complex. The water-soluble viscosity reducer complex (VRC) contains a hydrophobic component that is a tri-polymer containing acrylamide or an acrylamide derivative, cyclodextrin or a cyclodextrin derivative, and a pyrene-based monomer; and a hydrophilic component containing a polyaromatic compound and a poly(ethylene glycol) (PEG). In some embodiments, the hydrophobic component and the hydrophilic component self-assemble to form the viscosity reducer complex via a host-guest interaction.

In some embodiments of the VRC, the tri-polymer contains about 90 wt% to about 95 wt% of the acrylamide or an acrylamide derivative. In some embodiments, the tri-polymer contains about 94 wt% of the acrylamide or an acrylamide derivative.

In some embodiments of the VRC, the tri-polymer contains about 1 wt% to about 5 wt% of the cyclodextrin or cyclodextrin derivative. In some embodiments, the tri-polymer contains about 2 wt% to about 3 wt% of the cyclodextrin or cyclodextrin derivative. In some embodiments, the tri-polymer contains about 3 wt% of the cyclodextrin or cyclodextrin derivative. In some embodiments, the cyclodextrin or cyclodextrin derivative is a β-cyclodextrin (β-CD). In some embodiments, the cyclodextrin or cyclodextrin derivative is allyl-β-cyclodextrin.

In some embodiments of the VRC, the tri-polymer contains about 1 wt% to about 5 wt% of the pyrene-based monomer. In some embodiments, the tri-polymer contains about 2 wt% to about 3 wt% of the pyrene-based monomer. In some embodiments, the tri-polymer contains about 3 wt% of the pyrene-based monomer. In some embodiments, the pyrene-based monomer is selected from the group consisting of pyrene, methylpyrene, benzo[a]pyrene, pyrenemethanol, pyrenebutanol, pyrenebutyric acid, 1-pyrenemethyl acrylate, and mixtures thereof. In some embodiments, the pyrene-based monomer is 1-pyrenemethyl acrylate.

In some embodiments of the VRC, the tri-polymer is acrylamide:allyl-β-cyclodextrin:1-pyrenemethyl acrylate. In some embodiments, the tri-polymer has a molar ratio of 94:3:3 of the acrylamide:allyl-β-cyclodextrin:1-pyrenemethyl acrylate.

In some embodiments of the VRC, the polyaromatic compound is naphthalene or a derivative thereof.

In some embodiments of the VRC, the molecular weight of the PEG is about 1,000 g/mol to about 5,000 g/mol. In some embodiments, the molecular weight of the PEG is about 2,000 g/mol.

Also provided in the present disclosure is a composition that includes an aqueous solution and a water-soluble viscosity reducer complex that includes a hydrophobic component that is a tri-polymer comprising acrylamide or an acrylamide derivative, cyclodextrin or a cyclodextrin derivative, and a pyrene-based monomer; and a hydrophilic component containing a polyaromatic compound and a poly (ethylene glycol) (PEG). In some embodiments, the aqueous solution is reservoir brine. In some embodiments, the hydrophobic component and the hydrophilic component self-assemble in the aqueous solution to form the viscosity reducer complex.

In some embodiments of the composition, the hydrophobic component is about 0.3 wt% to about 0.6 wt% of the aqueous solution and the hydrophilic component is about 0.3 wt% to about 0.6 wt% of the aqueous solution.

In some embodiments of the composition, the hydrophobic component is the tri-polymer acrylamide:allyl-β-cyclodextrin:1-pyrenemethyl acrylate.

In some embodiments of the composition, the hydrophilic component is naphthalene-PEG.

Also provided in the present disclosure is a method of reducing the viscosity of heavy crude oil. In some embodiments, the method includes adding a composition that includes a water-soluble viscosity reducer complex to heavy crude oil in an amount sufficient to reduce the viscosity of the heavy crude oil, where the viscosity reducer complex includes a hydrophobic component that is a tri-polymer comprising acrylamide or an acrylamide derivative, cyclodextrin or a cyclodextrin derivative, and a pyrene-based monomer; and a hydrophilic component that contains a is polyaromatic compound and a poly(ethylene glycol) (PEG). In some embodiments, the amount of VRC sufficient to reduce the viscosity of the heave crude oil is about 0.1 wt% to about 0.5 wt% of the total amount of oil. In some embodiments, the amount of VRC sufficient to reduce the viscosity of the heave crude oil is about 0.2 wt% of the total amount of oil.

In some embodiments of the method, the composition containing the water-soluble viscosity reducer complex further includes an aqueous solution. In some embodiments, the aqueous solution is reservoir brine.

In some embodiments of the method, the viscosity reducer complex interacts with an asphaltene in the heavy oil to solubilize the asphaltene aggregates. In some embodiments, the solubilized asphaltene aggregates form an oil-in-water emulsion.

DETAILED DESCRIPTION

Figure 1:
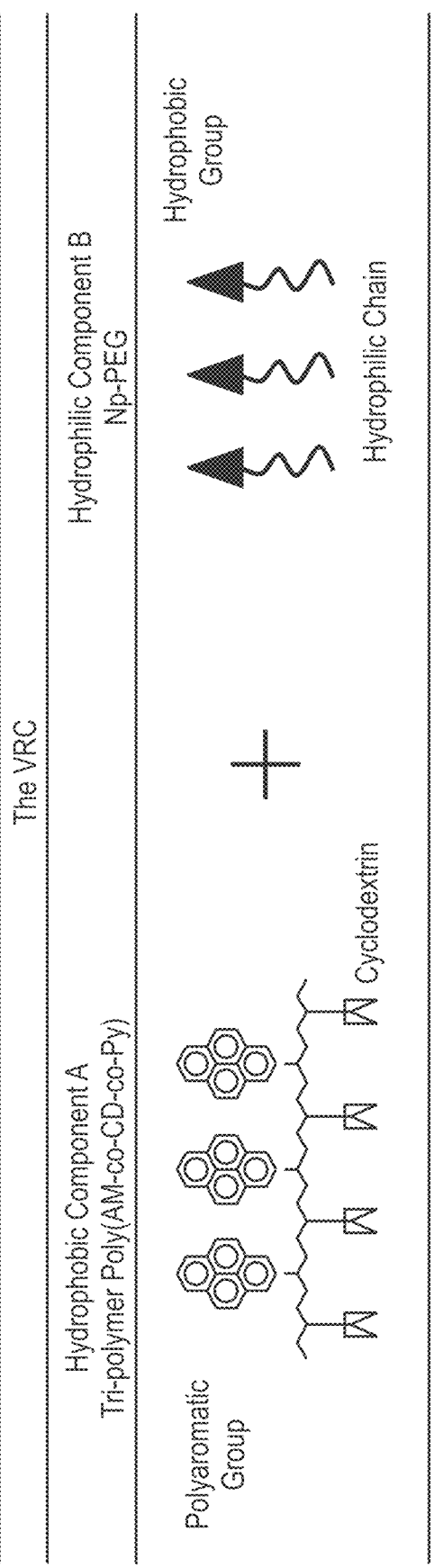
FIG. 1 is a diagrammatic sketch showing the chemical structures of the hydrophobic component and the hydrophilic component of the viscosity reducer complex.

Provided in the present disclosure is a water-soluble viscosity reducer complex (VRC) that possesses characteristics of both oil-soluble and water-soluble viscosity reducers. Oil-based viscosity reducers are composed of macromolecule polymers containing strong polar groups that form hydrogen bonds with resin and asphaltene molecules and thereby reduce the viscosity of heavy oil, whereas water-based viscosity reducers are composed of surfactants and stabilizers that convert an oil-water system into an O/W emulsion and can therefore reduce the viscosity of a heavy oil. The VRCs of the present disclosure are water-soluble with mechanisms of oil-soluble type viscosity reducers in heavy oil viscosity reduction. The chemical components of the VRCs of the present disclosure provide the VRCs with both dispersion and emulsification capabilities.

The water-soluble VRCs of the present disclosure are made up of two components—a hydrophobic component and a hydrophilic component—and possess a self-assembled molecular structure. The VRCs of the present disclosure are able to effectively reduce the viscosity of crude oil, such as heavy or extra-heavy crude oil. For example, in an emulsion comprising heavy oil and the VRC, the polycyclic aromatic hydrocarbons in the hydrophobic component of the VRC strongly interact with the asphaltene in heavy oil via π-π stacking, hydrogen bonding, and hydrophobic association to disperse the heavy oil structures, and the hydrophilic component associates with the hydrophobic component via host-guest interaction to improve the solubility of the VRC in an aqueous environment and to solubilize the asphaltene aggregates. In some embodiments, collapse of the asphaltene and resin aggregates results in a decrease of the viscosity of crude oil, such as heavy or extra-heavy crude oil.

The self-assembled VRCs of the present disclosure are based on polyaromatic hydrocarbon and cyclodextrin structures and exhibit high-temperature and high-salinity resistant properties and efficiently reduce the heavy oil viscosity via the mechanisms of oil-soluble viscosity reducers. For example, the polyaromatic hydrocarbons interact with the resins and asphaltenes in heavy oil to reduce the intermolecular Van der Waals forces, the dipole forces, and hydrogen bonding between asphaltene molecules, causing the overlapping and stacking structures formed by the aggregated asphaltene to collapse. Furthermore, the long hydrophilic chains solubilize and stabilize the hydrophobic polyaromatic groups as well as the emulsions, thereby decreasing the viscosity of the oil. Addition of the VRC favors the formation of an oil-in-water (O/W)-type emulsion whose viscosity is low compared to the heavy oil and a water-in-oil (W/O)-type emulsion. The host-guest interaction of the two components of the VRCs enhances the solubility of the VRCs in high-salinity water and the aromatic structures strongly interact with the components in heavy crude oil through non-covalent π-π stacking, hydrogen bonding, and hydrophobic association.

Accordingly, the VRCs of the present disclosure can be applied to heavy crude oil to reduce viscosity and thereby enhance fluidity of the crude oil. The VRCs of the present disclosure exhibit resistance to high temperatures and high salinity. The water-solubility of the VRCs of the present disclosure allows for a practical and enhanced oil recovery solution that can be easily implemented where a waterflooding infrastructure is present. Thus, the viscosity of the heavy oil in the subterranean formation and in the lifting process can be significantly reduced, thereby improving the exploitation quantity of the heavy oil resources.

Definitions

Unless otherwise defined, all technical and scientific terms used in this document have the same meaning as commonly understood by one of ordinary skill in the art to which the present application belongs. Methods and materials are described in this document for use in the present application; other, suitable methods and materials known in the art can also be used. The materials, methods, and examples are illustrative only and not intended to be limiting. All publications, patent applications, patents, sequences, database entries, and other references mentioned in this document are incorporated by reference in their entirety. In case of conflict, the present specification, including definitions, will control.

As used in this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted is simultaneously within a single operation, and the resulting process will fall within the literal scope of the claimed process.

Viscosity Reducer Complexes (VRC)

The water-soluble viscosity reducer complexes of the present disclosure are made up of a hydrophobic component and a hydrophilic component. In some embodiments, the hydrophobic component is a cyclodextrin-based polymer. In some embodiments, the hydrophilic component is a polyaromatic-hydrocarbon-based polymer. Thus, in some embodiments, the VRCs are made up of polyaromatic-hydrocarbon-based polymers and cyclodextrin-based polymers (FIG. 1). In some embodiments, such as in an aqueous environment, the VRCs self-assemble. In some embodiments, the VRCs self-assemble via host-guest interaction.

In some embodiments, the hydrophobic component of the VRCs of the present disclosure is a tri-polymer. In some embodiments, the hydrophobic component is a cyclodextrin-based polymer. In some embodiments, the tri-polymer includes an acrylamide (AM) or acrylamide derivative, cyclodextrin (CD), and a pyrene (PY)-based monomer (Poly (AM-co-CD-co-Py)). In some embodiments, the pyrene-based monomer is a polycyclic aromatic structures that is a pyrene or pyranyl derivative. In some embodiments, the hydrophobic component is not soluble in water. In some embodiments, the hydrophilic component of the VRCs of the present disclosure is a polyaromatic-hydrocarbon-based polymer. In some embodiments, the hydrophilic component is a naphthalene (Np) attached to a poly(ethylene glycol) (PEG) (Np-PEG). In some embodiments, in an aqueous solution, the CD units of the hydrophobic component and the naphthyl groups of the hydrophilic component self-assemble via host-guest interaction. In some embodiments, the long hydrophilic chains of the PEG in the hydrophilic component allow the self-assembled VRC excellent solubility in water or in emulsions.

Hydrophobic Component

The hydrophobic component of the VRCs of the present disclosure is a tri-polymer. In some embodiments, the tri-polymer includes an acrylamide (AM) or acrylamide derivative, cyclodextrin (CD), and a pyrene (PY)-based monomer (poly(AM-co-CD-co-Py)). In some embodiments, the hydrophobic component is not soluble in water.

In some embodiments, the tri-polymer of the hydrophobic component of the VRCs of the present disclosure contains an acrylamide or an acrylamide derivative. In some embodiments, the tri-polymer of the hydrophobic component of the VRCs of the present disclosure contains an acrylamide having the structure:

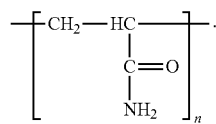

In some embodiments, the tri-polymer of the hydrophobic component of the VRCs of the present disclosure contains an acrylamide derivative having the structure:

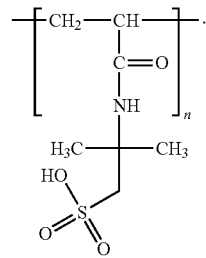

In some embodiments, the acrylamide derivative is 2-acrylamido-2-methylpropane sulfonic acid (AMPS).

In some embodiments, the amount of acrylamide or an acrylamide derivative in the tri-polymer is about 90 wt% to about 95 wt%, such as about 90 wt% to about 95 wt%, about 90 wt% to about 94 wt%, about 90 wt% to about 93 wt%, about 90 wt% to about 92 wt%, about 90 wt% to about 91 wt%, about 91 wt% to about 95 wt%, about 91 wt% to about 94 wt%, about 91 wt% to about 93 wt%, about 91 wt% to about 92 wt%, about 92 wt% to about 95 wt%, about 92 wt% to about 94 wt%, about 92 wt% to about 93 wt%, about 93 wt% to about 95 wt%, about 93 wt% to about 94 wt%, about 94 wt% to about 95 wt%, or about 90 wt%, about 91 wt%, about 92 wt%, about 93 wt%, about 94 wt%, or about 95 wt%. In some embodiments, the amount of acrylamide (AM) or an acrylamide derivative in the tri-polymer is about 94 wt%.

In some embodiments, the tri-polymer of the hydrophobic component of the VRCs of the present disclosure contains cyclodextrin or a cyclodextrin derivative. In some embodiments, the ring compound is a cyclodextrin or a cyclodextrin derivative. Cyclodextrin derivatives are compounds obtained by substituting hydroxyl groups of cyclodextrin with polymer chains, substituents, or both. Examples of suitable polymer chains include, but are not limited to, is polyethylene glycol, polypropylene glycol, polyethylene, polypropylene, polyvinyl alcohol, polyacrylate, polylactone, and polylactam. Examples of suitable substituents include, but are not limited to, hydroxyl, thionyl, amino, sulfonyl, phosphonyl, acetyl, alkyl groups (for example, methyl, ethyl, propyl, and isopropyl), trityl, tosyl, trimethylsilane, and phenyl.

Examples of suitable cyclodextrin and cyclodextrin derivatives include, but are not limited to, β-cyclodextrin (the number of glucose residues=7, inner diameter of opening=about 0.6 to 0.8 μm), glucuronyl glucosyl-β-cyclodextrin, heptakis(2,6-di-O-methyl)-β-cyclodextrin, heptakis(2,6-di-O-ethyl)-β-cyclodextrin, heptakis(6-O-sulfo)-β-cyclodextrin, heptakis(2,3-di-O-acetyl-6-O-sulfo)β-cyclodextrin, heptakis(2,3-di-O-methyl-6-O-sulfo)-β-cylcodextrin, heptakis(2,3,6-tri-O-acetyl)-β-cyclodextrin, heptakis(2,3,6-tri-O-benzoyl)-β-cyclodextrin, heptakis(2,3,6-tri-O-methyl)β-cyclodextrin, heptakis(3-O-acetyl-2,6-di-O-methyl)-β-cyclodextrin, heptakis(2,3-O-acetyl-6-bromo-6-deoxy)-β-cyclodextrin, 2-hydroxyethyl-β-cyclodextrin, hydroxypropyl-β-cyclodextrin, 2-hydroxypropyl-β-cyclodextrin, (2-hydroxy-3-N,N,N-trimethylamino)propyl-β-cyclodextrin, 6-O-α-maltosyl-β-cyclodextrin, methyl-β-cyclodextrin, hexakis(6-amino-6-deoxy)-β-cyclodextrin, bis(6-azido-6-deoxy)-β-cyclodextrin, mono(2-O-phosphoryl)-β-cyclodextrin, hexakis [6-deoxy-6-(1-imidazolyl)]-β-cyclodextrin, monoacetyl-β-cyclodextrin, triacetyl-β-cyclodextrin, monochlorotriazinyl-β-cyclodextrin, 6-O-α-D-glucosyl-β-cyclodextrin, 6-O-α-D-maltosyl-β- cyclodextrin, succinyl-β-cyclodextrin, succinyl-(2-hydroxypropyl)β-cyclodextrin, 2-carboxymethyl-β-cyclodextrin, 2-carboxyethyl-β-cyclodextrin, butyl-β-cyclodextrin, sulfopropyl-β-cyclodextrin, 6-monodeoxy-6-monoamino-β-cyclodextrin, and silyl[(6-O-t-butyldimethyl)2,3-di-O-acetyl]-β-cyclodextrin.

In some embodiments, the cyclodextrin is a β-CD. In some embodiments, the cyclodextrin is allyl-β-CD. In some embodiments, the β-cyclodextrin has the structure:

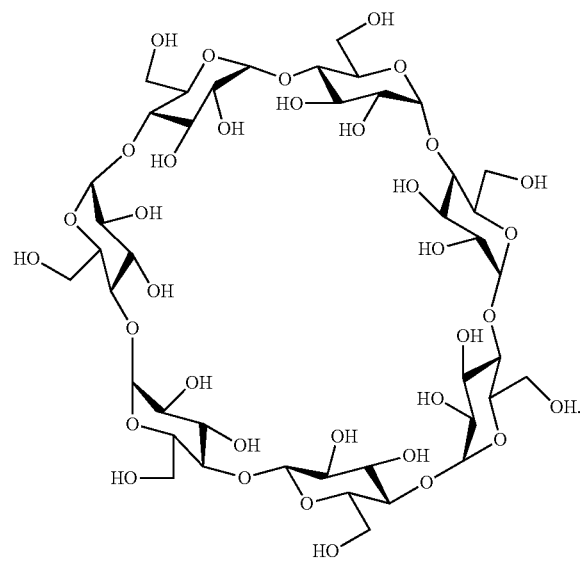 [SMILES: OCC1O[C@@H]2O[C@@H]3C(CO)O[C@H](O[C@@H]4C(CO)O[C@H](O[C@@H]5C(CO)O[C@@H](O[C@@H]6C(CO)O[C@H](O[C@@H]7C(CO)O[C@H](O[C@@H]8C(CO)O[C@H](O[C@H]1C(O)C2O)C(O)C8O)C(O)C7O)C(O)C6O)C(O)C5O)C(O)C4O)C(O)C3O]

In some embodiments, the amount of cyclodextrin or cyclodextrin derivative in the tri-polymer is about 1 wt% to about 5 wt%, such as about 1 wt% to about 4 wt%, about 1 wt% to about 3 wt%, about 1 wt% to about 2 wt%, about 2 wt% to about 5 wt%, about 2 wt% to about 4 wt%, about 2 wt% to about 3 wt%, about 3 wt% to about 5 wt%, about 3 wt% to about 4 wt%, about 4 wt% to about 5 wt%, or about 1 wt%, about 2 wt%, about 3 wt%, about 4 wt%, or about 5 wt%. In some embodiments, the amount of cyclodextrin or cyclodextrin derivative in the tri-polymer is about 2 wt% to about 3 wt%. In some embodiments, the amount of cyclodextrin or is cyclodextrin derivative in the tri-polymer is about 2 wt%. In some embodiments, the amount of cyclodextrin or cyclodextrin derivative in the tri-polymer is about 3 wt%. In some embodiments, the cyclodextrin or cyclodextrin derivative is β-cyclodextrin. In some embodiments, the cyclodextrin or cyclodextrin derivative is allyl-β-cyclodextrin.

In some embodiments, the tri-polymer of the hydrophobic component of the VRCs of the present disclosure contains a pyrene (PY)-based monomer. In some embodiments, the pyrene-based monomer is a polycyclic aromatic structure that is a pyrene or pyranyl derivative. Examples of suitable pyrene or pyrene derivatives include, but are not limited to, pyrene, methylpyrene, benzo[a]pyrene, pyrenemethanol, pyrenebutanol, pyrenebutyric acid, 1-pyrenemethyl acrylate, and mixtures thereof. In some embodiments, the pyrene derivative is pyrenemethanol. In some embodiments, the pyrene derivative is 1-pyrenemethyl acrylate. In some embodiments, the hydrophobic components containing pyrene derivatives do not undergo hydrolysis and remain stable at high-temperature and high-salinity conditions.

In some embodiments, the amount of pyrene (PY)-based monomer in the tri-polymer is about 1 wt% to about 5 wt%, such as about 1 wt% to about 4 wt%, about 1 wt% to about 3 wt%, about 1 wt% to about 2 wt%, about 2 wt% to about 5 wt%, about 2 wt% to about 4 wt%, about 2 wt% to about 3 wt%, about 3 wt% to about 5 wt%, about 3 wt% to about 4 wt%, about 4 wt% to about 5 wt%, or about 1 wt%, about 2 wt%, about 3 wt%, about 4 wt%, or about 5 wt%. In some embodiments, the amount of pyrene (PY)-based monomer in the tri-polymer is about 2 wt% to about 3 wt%. In some embodiments, the amount of pyrene (PY)-based monomer in the tri-polymer is about 2 wt%. In some embodiments, the amount of pyrene (PY)-based monomer in the tri-polymer is about 3 wt%. In some embodiments, the pyrene (PY)-based monomer is pyrene. In some embodiments, the pyrene (PY)-based monomer is 1-pyrenemethyl acrylate.

In some embodiments, the tri-polymer hydrophobic component of the VRCs of the present disclosure is made up of acrylamide (AM) or an acrylamide derivative, allyl-β-cyclodextrin (A-β-CD), and 1-pyrenemethyl acrylate (PyAc). In some embodiments, the tri-polymer hydrophobic component of the VRCs of the present disclosure is AM:A-β-CD:PyAc (PAMCDPY). In some embodiments, PAMCDPY has a molar ratio of 94:3:3.

Hydrophilic Component

The hydrophilic component of the VRCs of the present disclosure includes an aromatic compound, such as a polyaromatic compound. Examples of suitable polyaromatic compounds include, but are not limited to, naphthalene, anthracene, phenanthrene, methylnaphthalene, naphthalenemethanol, and derivatives and combinations thereof. In some embodiments, the polyaromatic compound is naphthanlene.

The hydrophilic component of the VRCs of the present disclosure includes a poly(ethylene glycol) (PEG). The PEG can bind to the polyaromatic in any position on the polyaromatic ring that is available. In some embodiments, the molecular weight of the PEG is about 1,000 g/mol to about 5,000 g/mol, such as about 1,000 g/mol to about 4,500 g/mol, about 1,000 g/mol to about 4,000 g/mol, about 1,000 g/mol to about 3,500 g/mol, about 1,000 g/mol to about 3,000 g/mol, about 1,000 g/mol to about 2,500 g/mol, about 1,000 g/mol to about 2,000 g/mol, about 1,000 g/mol to about 1,500 g/mol, about 1,500 g/mol to about 5,000 g/mol, about 1,500 g/mol to about 4,500 g/mol, about 1,500 g/mol to about 4,000 g/mol, about 1,500 g/mol to about 3,500 g/mol, about 1,500 g/mol to about 3,000 g/mol, about 1,500 g/mol to about 2,500 g/mol, about 1,500 g/mol to about 2,000 g/mol, about 2,000 g/mol to about 5,000 g/mol, about 2,000 g/mol to about 4,500 g/mol, about 2,000 g/mol to about 4,000 g/mol, about 2,000 g/mol to about 3,500 g/mol, about 2,000 g/mol to about 3,000 g/mol, about 2,000 g/mol to about 2,500 g/mol, about 2,500 g/mol to about 5,000 g/mol, about 2,500 g/mol to about 4,500 g/mol, about 2,500 g/mol to about 4,000 g/mol, about 2,500 g/mol to about 3,500 g/mol, about 2,500 g/mol to about 3,000 g/mol, about 3,000 g/mol to about 5,000 g/mol, about 3,000 g/mol to about 4,500 g/mol, about 3,000 g/mol to about 4,000 g/mol, about 3,000 g/mol to about 3,500 g/mol, about 3,500 g/mol to about 5,000 g/mol, about 3,500 g/mol to about 4,500 g/mol, about 3,500 g/mol to about 4,000 g/mol, about 4,000 g/mol to about 5,000 g/mol, about 4,000 g/mol to about 4,500 g/mol, about 4,500 g/mol to about 5,000 g/mol, or about 1,000 g/mol, about 1,200 g/mol, about 1,500 g/mol, about 1,700 g/mol, about 2,000 g/mol, about 2,200 g/mol, about 2,500 g/mol, about 2,700 g/mol, about 3,000 g/mol, is about 3,200 g/mol, about 3,500 g/mol, about 3,700 g/mol, about 4,000 g/mol, about 4,200 g/mol, about 4,500 g/mol, about 4,700 g/mol, or about 5,000 g/mol. In some embodiments, the molecular weight of the PEG is about 2,000 g/mol.

In some embodiments, the hydrophilic component of the VRCs of the present disclosure is made up of a polyaromatic compound and a PEG. In some embodiments, the hydrophilic component of the VRCs of the present disclosure is made up of naphthalene and a PEG (NpPEG). In some embodiments, the PEG has a molecular weight of about 2,000 g/mol. In some embodiments, the polyaromatic-hydrocarbon-based hydrophilic component has the structure:

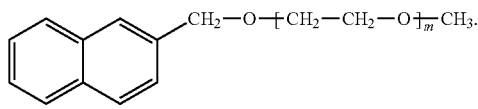

Self-assembled VRC

Provided in the present disclosure are water-soluble polyaromatic-hydrocarbon-based self-assembled viscosity reducer complexes that contain the hydrophobic and hydrophilic components described herein. In some embodiments, the hydrophobic component and the hydrophilic component self-assemble in an aqueous solution. In some embodiments, the aqueous solution is brine, such as reservoir brine. In some embodiments, the hydrophilic component associates with the hydrophobic component via host-guest interaction, where the hydrophobic component is the host molecule and the hydrophilic component is the guest molecule.

In some embodiments, preparation of the water-soluble polyaromatic-hydrocarbon-based self-assembled viscosity reducer in an aqueous solution for application with heavy crude oil includes the following steps:

(1) Synthesis of the PEG modified with the polyaromatic end group. In some embodiments, the polyaromatic compound is naphthalene.

(2) Preparation of the copolymer bearing they cyclodextrin or cyclodextrin derivative and pyrene or pyrene derivative groups. In some embodiments, the cyclodextrin or cyclodextrin derivative is β-CD. In some embodiments, the pyrene or pyrene derivative is pyrene.

(3) Addition of the hydrophobic component prepared in step (2) to high-salinity brine, with vigorous stirring to yield a homogeneously suspended solution.

(4) Mixing the suspended solution yielded in step (3) with the polyaromatic-modified PEG hydrophilic component prepared in step (1), with continuous stirring to yield a homogeneously transparent solution.

(5) Mixing the solution yielded in step (4) with heavy oil at a temperature of about 40° C. to about 60° C. according to an oil-to-water ratio of about 70:30 to about 60:40 under a shear rate of about 1000 s$^{-1}$. In some embodiments, the solution is mixed with heavy oil at a temperature of about 50° C.

In some embodiments, the steps are performed sequentially. In some embodiments, the order of the steps varies. In some embodiments, the VRC solutions form stable emulsions with heavy oil.

In some embodiments, the VRC complex in an aqueous solution contains about 0.3% to about 0.6% of the hydrophobic component and about 0.3% to about 0.6% of the hydrophilic component by weight percent of the aqueous solution. In some embodiments, the aqueous solution is reservoir brine.

Thus, also provided in the present disclosure is a method of preparing a VRC complex. In some embodiments, the method includes combining a hydrophobic component, such as a hydrophobic component as described in the present disclosure, and a hydrophilic component, such a hydrophilic component as described in the present disclosure, in an aqueous solution. In some embodiments, the hydrophobic component and the hydrophilic component self-assemble via host-guest interaction. In some embodiments, the aqueous solution is reservoir brine.

The self-assembled VRCs of the present disclosure exhibit high-temperature and high-salinity resistant properties and efficiently reduce the heavy oil viscosity via the mechanisms of oil-soluble viscosity reducers. For example, the polyaromatic hydrocarbons interact with the resins and asphaltenes in heavy oil to reduce the intermolecular Van der Waals forces, the dipole forces, and hydrogen bonding between asphaltene molecules, causing the overlapping and stacking structures formed by the aggregated asphaltene to collapse.

Methods of Reducing Heavy Oil Viscosity

Also provided in the present disclosure is a method reducing the viscosity of heavy crude oil. In some embodiments, the method includes adding a composition that contains a water-soluble viscosity reducer complex to heavy crude oil and forming an oil-in-water emulsion, thereby reducing the viscosity of the heavy crude oil. In some embodiments, the viscosity reducer complex is is a viscosity reducer complex as described in the present disclosure. For example, the viscosity reducer complex includes a hydrophobic component that is a tri-polymer comprising acrylamide or an acrylamide derivative, cyclodextrin or a cyclodextrin derivative, and a pyrene-based monomer; and a hydrophilic component made up on a polyaromatic compound and a poly(ethylene glycol) (PEG). In some embodiments, the viscosity reducer complex is in an aqueous solution. In some embodiments, the aqueous solution is reservoir brine. In some embodiments, the VRCs form stable emulsions with the heavy crude oil. In some embodiments, the method includes the step of preparing the VRC as described in the present disclosure. In some embodiments, the method includes preparing an aqueous solution containing the VRC as described in the present disclosure.

Thus, provided in the present disclosure is a method of reducing the viscosity of heavy crude oil, the method including adding a composition containing a water-soluble viscosity reducer complex to heavy crude oil in an amount sufficient to reduce the viscosity of the heavy crude oil. In some embodiments, the viscosity reducer complex contains a hydrophobic component that is a tri-polymer containing acrylamide or an acrylamide derivative, cyclodextrin or a cyclodextrin derivative, and a pyrene-based monomer; and a hydrophilic component containing a polyaromatic compound and a poly(ethylene glycol) (PEG). In some embodiments, the amount of the composition that is sufficient to reduce the viscosity of the heavy crude oil is about 0.1 wt% to about 0.5 wt% of the total amount of oil, such as about 0.1 wt% to about 0.4 wt%, about 0.1 wt% to about 0.3 wt%, about 0.1 wt% to about 0.2 wt%, about 0.2 wt% to about 0.5 wt%, about 0.2 wt% to about 0.4 wt%, about 0.2 wt% to about 0.3 wt%, about 0.3 wt% to about 0.5 wt%, about 0.3 wt% to about 0.4 wt%, about 0.4 wt% to about 0.5 wt%, or about 0.1 wt%, about 0.2 wt%, about 0.3 wt%, about 0.4 wt%, or about 0.5 wt%. In some embodiments the amount of the composition that is sufficient to reduce the viscosity of the heavy crude oil is about 0.2 wt% of the total amount of oil.

Without wishing to be bound by any particular theory, it is believed that the asphaltene compounds in heavy crude oil strongly interact with the pyrene-based monomer of the hydrophobic component of the VRC and the polyaromatic groups of the hydrophilic component of the VRC via π-π stacking and hydrogen bonding. In some embodiments, the pyrene-based monomer is pyrene. In some embodiments, the hydrophobic component is the copolymer PAMCDPY. In some embodiments, the polyaromatic group is naphthalene. In some embodiments, the hydrophilic component is NpPEG. The hydrophobic component, acting as a host molecule, is binds to the surface of heavy oil aggregates by solubilizing its hydrophobic groups into the interior of the heavy oil. Then the hydrophilic component, acting as a guest molecule, inserts its polyaromatic groups into the hydrophobic cavity of the cyclodextrin or cyclodextrin derivative, with the hydrophilic PEG chains extending to the outside of the whole particles in the aqueous phase. Excess guest molecules can also interact with the asphaltene via the polyaromatic groups to help to solubilize these components. In the presence of the hydrophilic chain of the guest molecule, the heavy oil block gradually collapses and forms small oil droplets which disperse in the aqueous phase as oil-in-water (O/W) emulsions, and the viscosity decreases accordingly.

In some embodiments of the methods of the present disclosure, the maximum viscosity is reduced by about 10% to about 80% or more after addition of the viscosity reducer complex of the present disclosure. In some embodiments, the viscosity of the heavy crude oil is reduced by at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, or more after addition of the VRC of the present disclosure.

Thus, also provided in the present disclosure is a method of enhancing the fluidity of heavy crude oil. In some embodiments, the method includes adding a composition that contains a water-soluble viscosity reducer complex to heavy crude oil and forming an oil-in-water emulsion, thereby reducing the viscosity of the heavy crude oil. In some embodiments, the viscosity reducer complex is a viscosity reducer complex as described in the present disclosure. For example, the viscosity reducer complex includes a hydrophobic component that is a tri-polymer comprising acrylamide or an acrylamide derivative, cyclodextrin or a cyclodextrin derivative, and a pyrene-based monomer; and a hydrophilic component made up on a polyaromatic compound and a poly(ethylene glycol) (PEG). In some embodiments, the viscosity reducer complex is in an aqueous solution. In some embodiments, the aqueous solution is reservoir brine. In some embodiments, the VRCs form stable emulsions with the heavy crude oil. In some embodiments, the method includes the step of preparing the VRC as described in the present disclosure. In some embodiments, the method includes preparing an aqueous solution containing the VRC as described in the present disclosure.

The VRCs of the present disclosure can be used for a variety of applications. In addition to a viscosity reducing agent, the compositions can be used as an enhanced oil recovery agent, a heavy oil upgrading agent, a wellbore cleaning agent, and a cleaning agent for asphaltene-containing materials.

EXAMPLES

Example 1-Synthesis of Hydrophilic Component B

The hydrophilic component of the VRC was prepared as follows. First, the hydroxyl ends of poly(ethylene glycol) methyl ether (PEG) (20 g, 0.01 mol, MW=2,000 g/mol) were reacted with p-toluenesulfonyl chloride (TsCl) (5.73 g, 0.03 mol) in 100 mL dichloromethane (DCM) in the presence of trimethylamine (TEA) (3.03 g, 0.03 mol) to yield PEG-Ts (Scheme 1). The yield of the intermediate product PEG-Ts was around 90%.

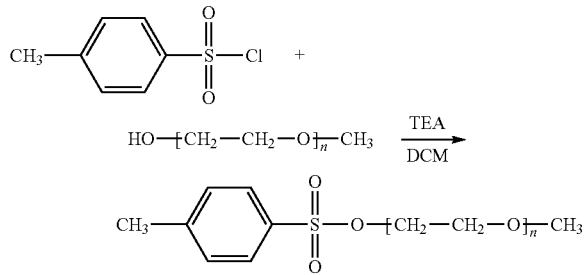

The toluenesulfonyl groups of PEG of the PEG-Ts were replaced by an excess of sodium naphthalenemethoxide which was previously yielded by reacting 2-naphthalenemethanol (7.91 g, 0.05 mol) with sodium hydride (NaH) (1.8 g, 60% dispersion in mineral oil, 0.045 mol) in 100 mL N,N-dimethylformamide (DMF) to obtain the PEG construct bearing naphthalene groups (NpPEG) as the hydrophilic component B of the VRC (Scheme 2).

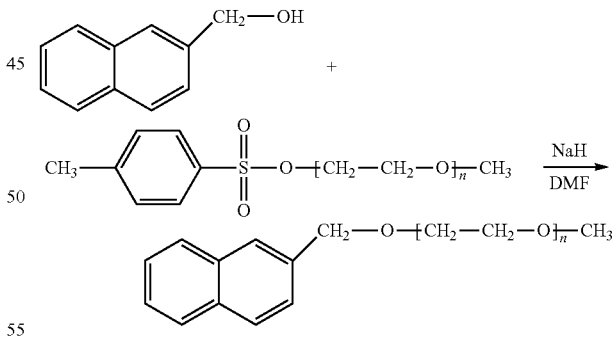

Figure 3:
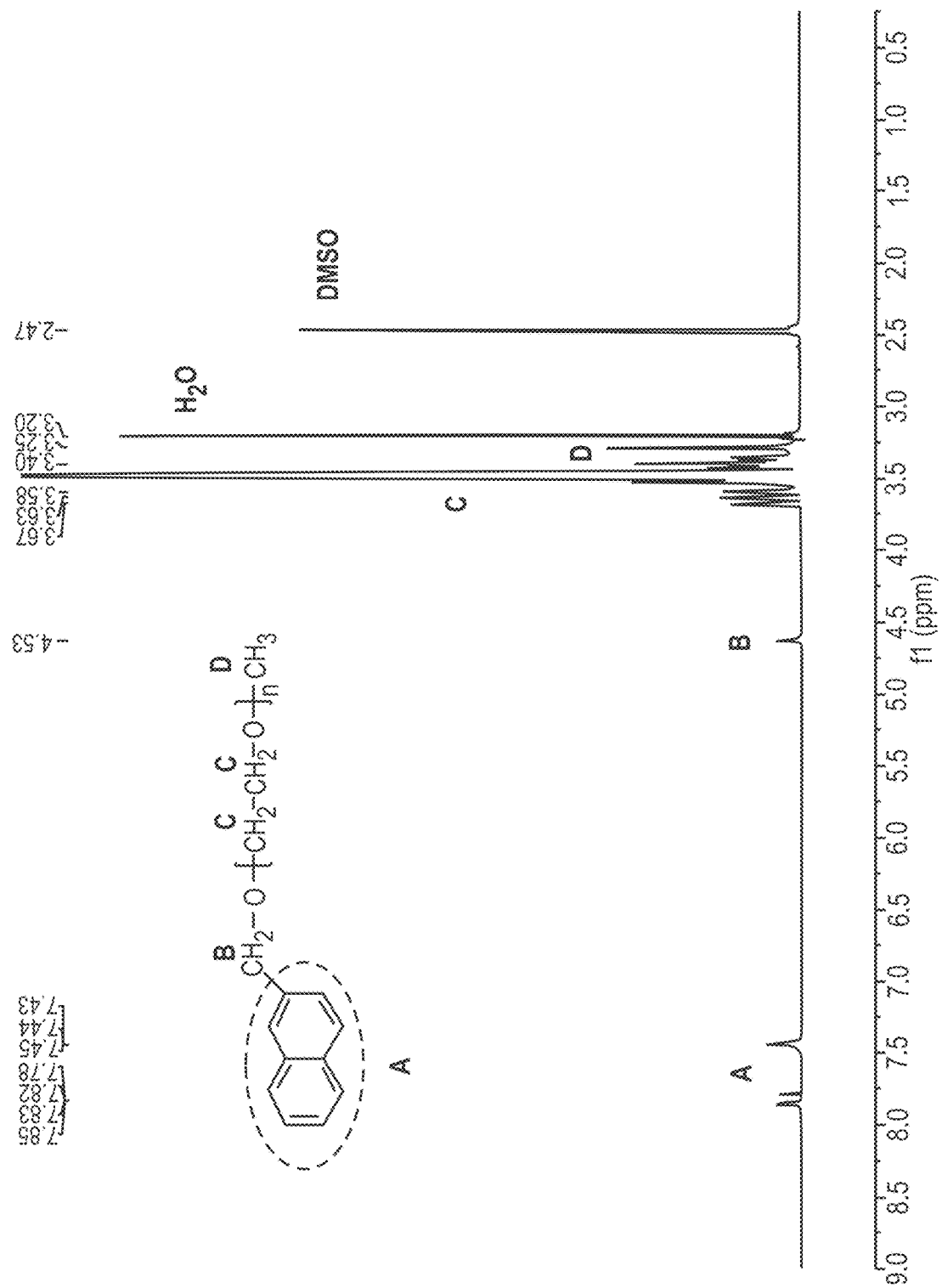
FIG. 3 is the $^1$H NMR spectrum of NpPEG in DMSO-$d_6$.

To purify the product, the obtained polymer in DMF was highly concentrated and dissolved in methanol, then placed in a fridge at 0° C. for several hours to precipitate the polymer. The mixture was centrifuged at 0° C., the supernatant was discarded, and the precipitate was dissolved in methane once more to repeat the process of purification. The purified product was obtained by precipitation in petroleum ether and dried under vacuum at room temperature. The yield of the final product NpPEG was 75%. $^1$H NMR spectrum of the final product in DMSO-$d_6$ is shown in FIG. 3.

PEG is a very stable polymer at high temperature. The thermal stability of a PEG sample in fine powder investigated by a TGA test showed a degradation temperature above 400° C. The molecular weight of PEG in this compound was between 1,000 g/mol and 5,000 g/mol. A PEG is with a low molecular weight (less than 1000 g/mol) failed to solubilize the hydrophobic component A, while a PEG with a high molecular weight (greater than 5000 g/mol) exhibited poor compatibility in high-salinity water at high temperature due to the cloud point of the PEG construct.

Example 2-Synthesis of Hydrophobic Component A

Figure 4:
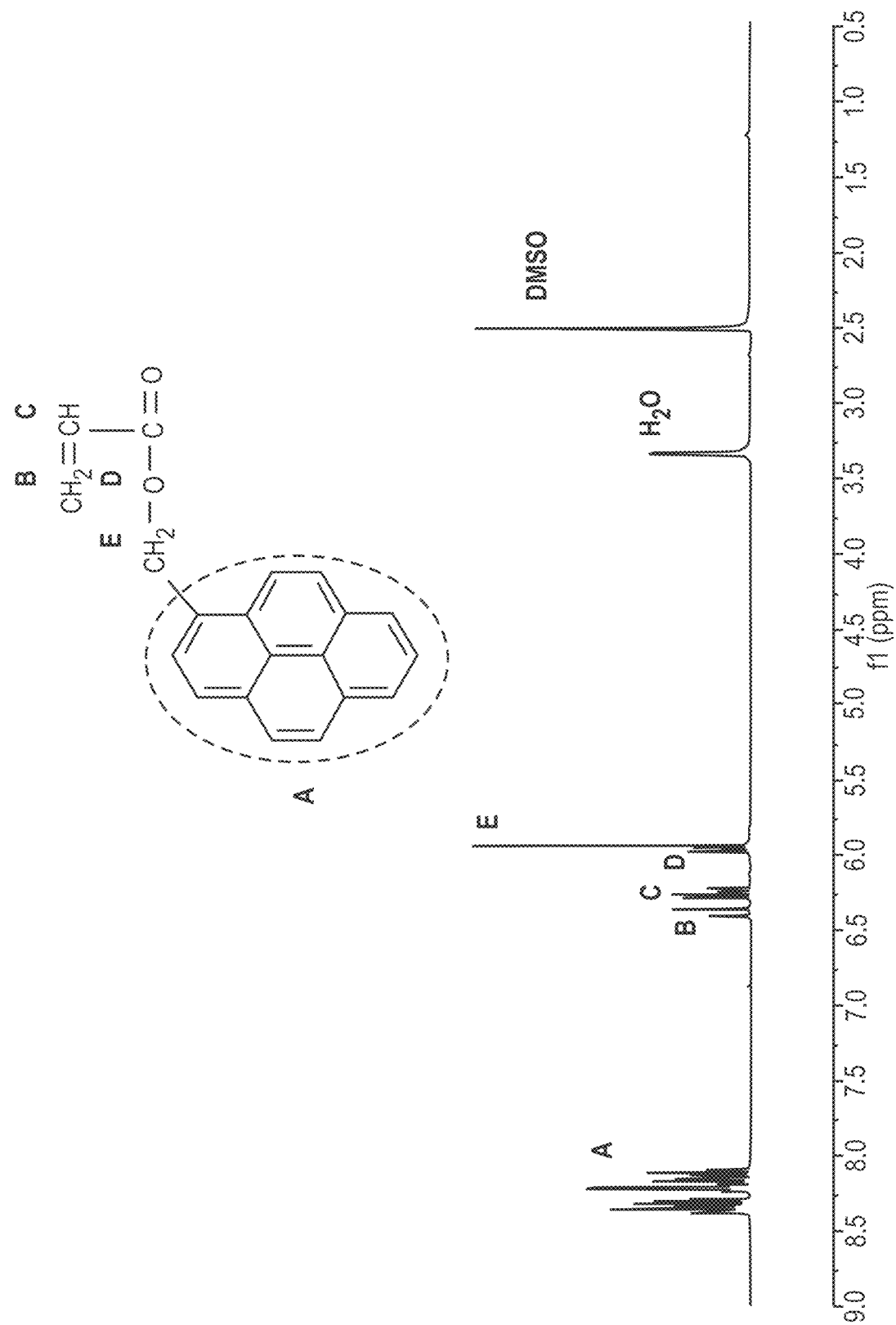
FIG. 4 is the $^1$H NMR spectrum of PyAc in DMSO-$d_6$.

The hydrophilic component (B) of the VRC was prepared as follows. 1-Pyrenemethanol (4.646 g, 0.02 mol) was dissolved in a three-neck flask in 100 mL of THF under a nitrogen atmosphere. Then TEA (8.4 mL, 0.06 mL) was added and the solution mixture was stirred for 1 h. A THF solution (25 mL) of acryloyl chloride (4.9 mL, 0.06 mol) was slowly dropped into the flask which was immersed in an ice water bath. The reaction continued overnight at room temperature. The yielded precipitate was removed by filtration, the filtrate was extracted by saturated sodium bicarbonate and DCM. The product 1-pyrenemethyl acrylate (PyAc) was separated from the organic phase followed by recrystallized in ethanol to obtain the pure product (Scheme 3). The yield of PyAc was 70%. $^1$H NMR spectrum of the final product PyAc in DMSO-$d_6$ is shown in FIG. 4.

Scheme 3

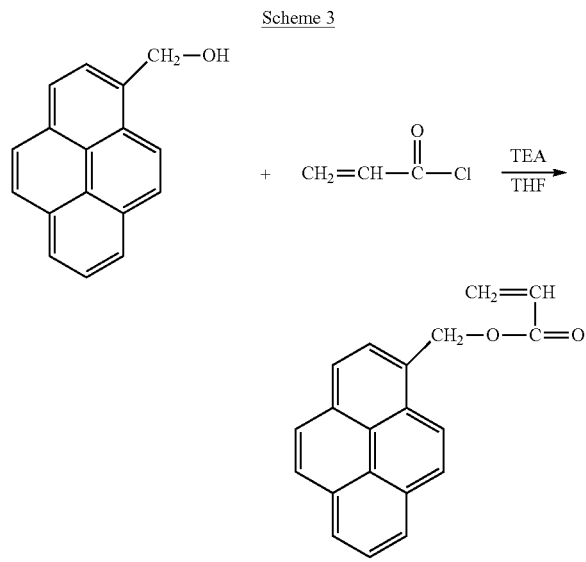

Figure 5:
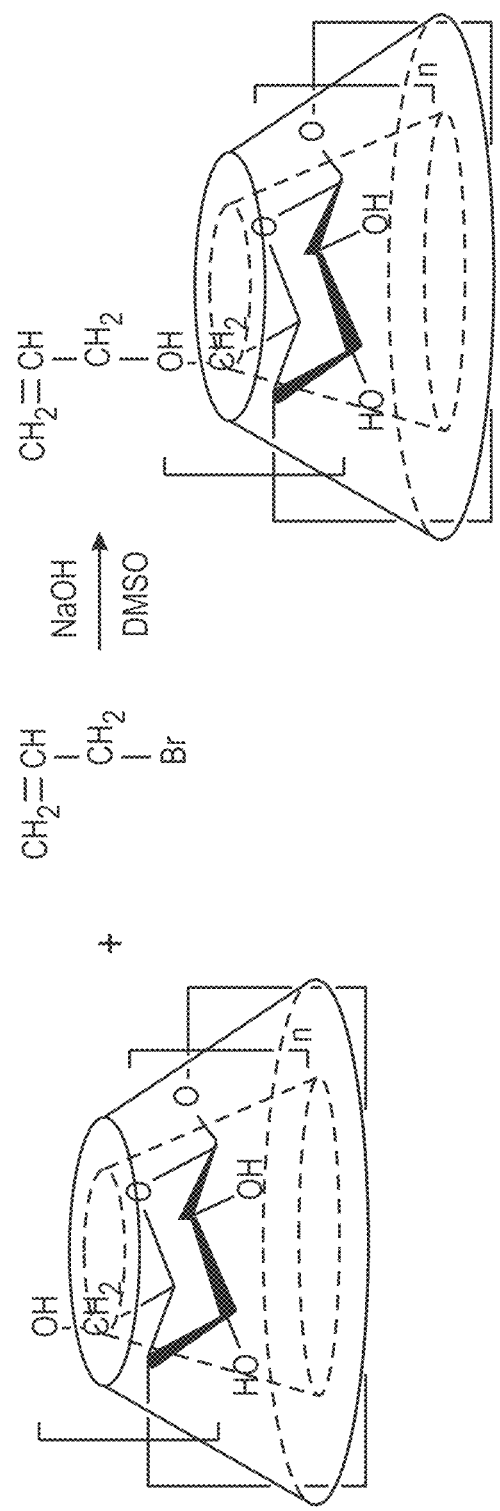
FIG. 5 shows the reaction scheme for the synthesis of A-β-CD final product in DMSO-$d_6$.

The scheme for the synthesis of A-β-CD is shown in FIG. 5. Briefly, β-cyclodextrin (β-CD) (4.54 g, 0.004 mol) was dissolved in a three-neck flask in 100 mL of DMF under a nitrogen atmosphere. Then 1.6 g of sodium hydroxide (NaOH) as a catalyst was added and the solution mixture was stirred for 1 h. Allyl bromide (4 mL, 0.046 mol) was slowly dropped into the flask which was immersed in an ice water bath. The reaction continued about 48 h at room temperature until the appearance of massive yellow precipitates. The solvent was removed by vacuum filtration, and a white powder allyl-β-cyclodextrin (A-β-CD) was obtained after washing with a large amount of petroleum ether. The final product was a mixture of A-β-CD and unmodified CD.

Figure 6:
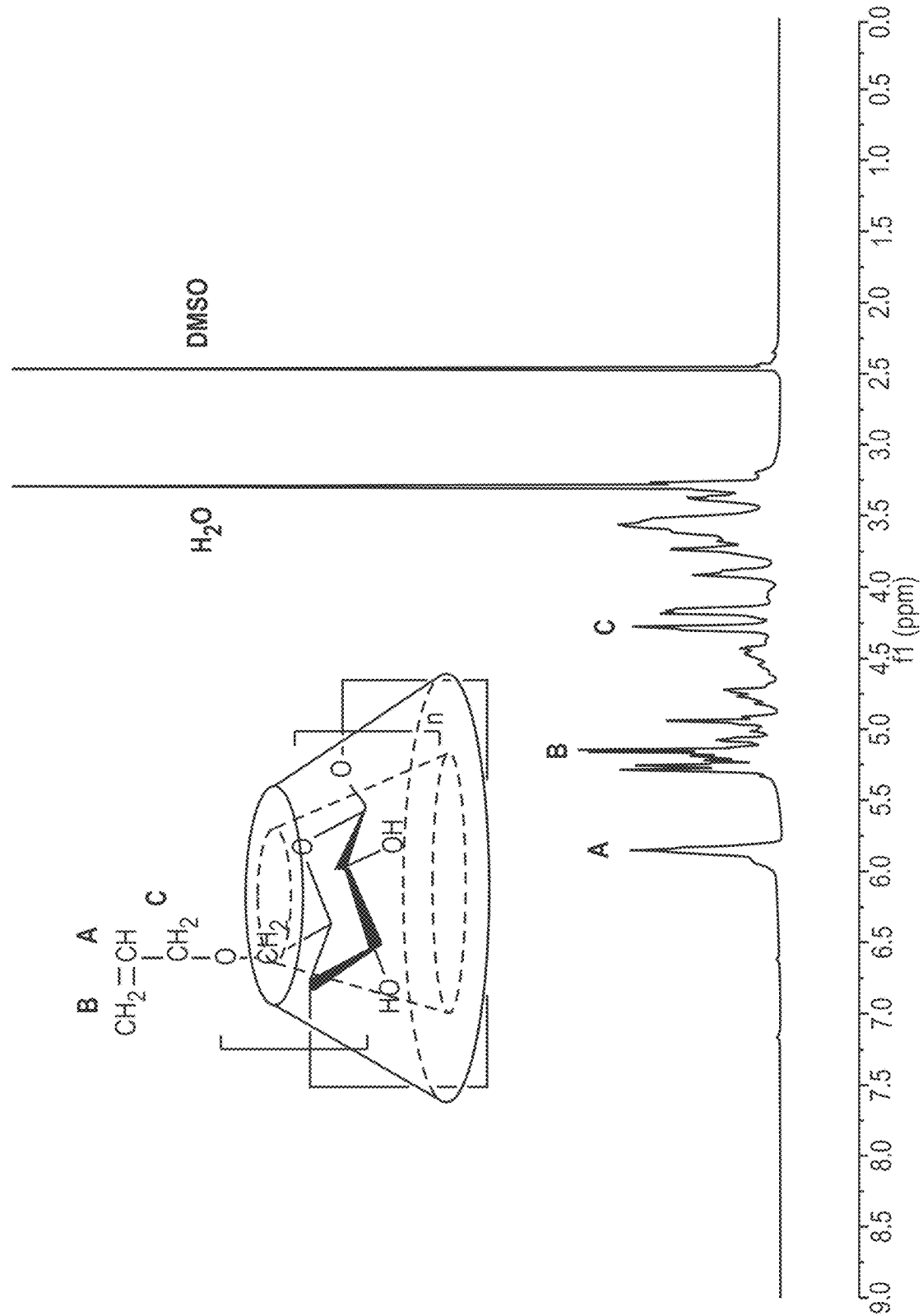
FIG. 6 is the $^1$H NMR spectrum of A-β-CD final product in DMSO-$d_6$.

The yield of the product was 80%. $^1$H NMR spectrum of the final product in DMSO-$d_6$ is shown in FIG. 6.

Figure 7:
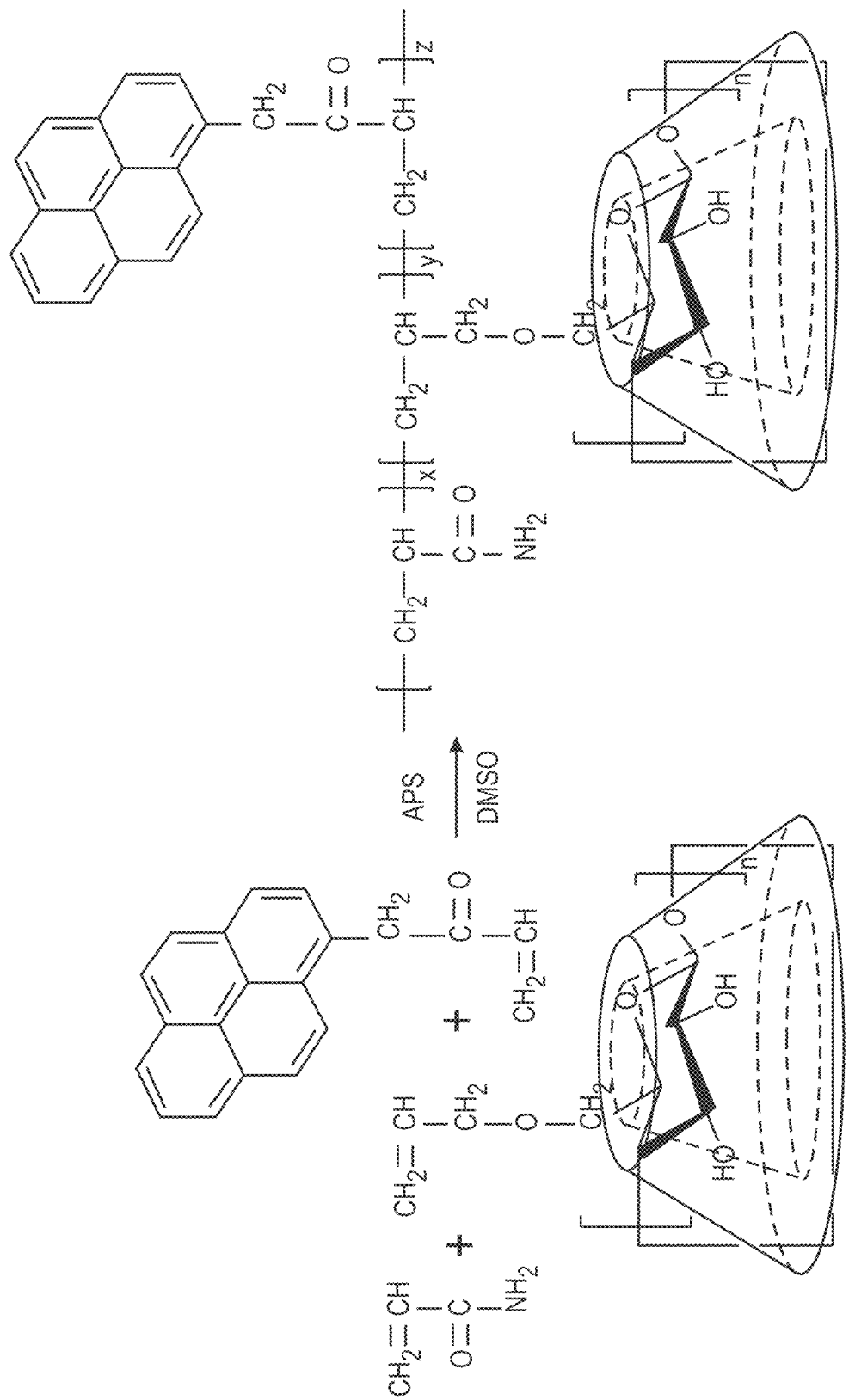
FIG. 7 shows the reaction scheme for the synthesis of PAMCDPY in DMSO-$d_6$.
Figure 8:
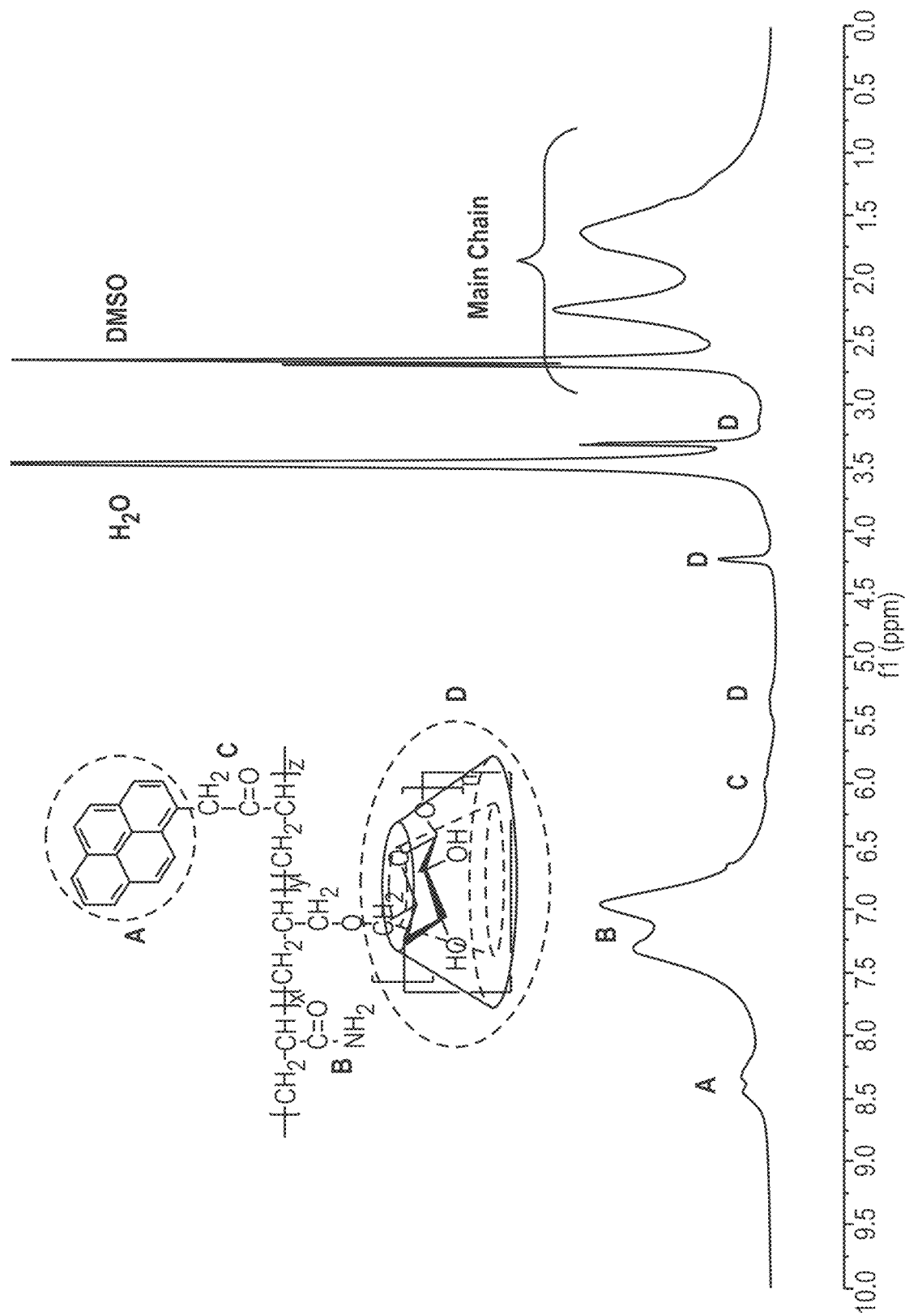
FIG. 8 is the $^1$H NMR spectrum of PAMCDPY in DMSO-$d_6$.

FIG. 7 illustrates the scheme for the synthesis of the copolymer PAMCDPY. Briefly, the copolymer was prepared by conventional radical polymerization. A predetermined amount of acrylamide (AM), A-β-CD and PyAc with a molar ratio of 94:3:3 (AM: A-β-CD:PyAc) were is dissolved in DMSO and transfered into a three-neck flask. After purging with nitrogen for 30 min, ammonium peroxodisulfate (APS) (0.5 mol% of total monomers) was added to the monomer solution. The reaction mixture was placed into the flask under stirring at 60° C. overnight. After that, the reaction mixture was poured into an excess of methanol to yield a precipitate. The obtained copolymer PAMCDPY as part A of the VRC was recovered by filtration and dried under vacuum. The yield of the copolymer was 70%. $^1$H NMR spectrum of the final product in DMSO-$d_6$ is shown in FIG. 8.

Example 3-Preparation of Viscosity Reducing Complex Solutions

A series of four viscosity reducing complex (VRC) solutions were prepared using the components described in Examples 1 and 2 and a synthetic reservoir brine solution (Table 1).

TABLE 1

| Synthetic reservoir brine solution | |
| --- | --- |
| Ions | Ion amount, ppm |
| $Na^+$ | 18,300 |
| $Ca^{2+}$ | 650 |
| $Mg^{2+}$ | 2,110 |
| $SO_4^{2-}$ | 4,290 |
| $Cl^-$ | 32,200 |
| $CO_3^{2-}$ | 0 |
| $HCO_3^-$ | 120 |
| TDS | 57,670 |

VRC 1

0.065 g of hydrophobic component A was dissolved into 20 mL reservoir brine under vigorous stirring at 25° C. for 2 h to obtain a suspended solution. 0.065 g of hydrophilic component B was added into the solution with continuous stirring for 2 h, yielding a transparent VRC solution for heavy oil viscosity reduction (VRC 1).

VRC 2

0.052 g of hydrophobic component A was dissolved into 20 mL reservoir brine under vigorous stirring at 25° C. for 2 h to obtain a suspended solution. 0.078 g of hydrophilic component B was added into the solution with continuous stirring for 2 h, yielding a transparent VRC solution for heavy oil viscosity reduction (VRC 2).

VRC 3

0.039 g of hydrophobic component A was dissolved into 20 mL reservoir brine under vigorous stirring at 25° C. for 2 h to obtain a suspended solution. 0.091 g of hydrophilic component B was added into the solution with continuous stirring for 2 h, yielding a transparent VRC solution for heavy oil viscosity reduction (VRC 3).

VRC 4

0.026 g of hydrophobic component A was dissolved into 20 mL reservoir brine under vigorous stirring at 25° C. for 2 h to obtain a suspended solution. 0.104 g of hydrophilic component B was added into the solution with continuous stirring for 2 h, yielding a transparent VRC solution for heavy oil viscosity reduction (VRC 4).

Example 4-Testing of the VRC Complexes in Crude Oil

Prior to testing with the VRC complex solutions prepared according to Example 3, heavy crude oil was stirred in a water bath at 60-70° C. for several hours to remove water and air bubbles. For the emulsification test, the dehydrated and degassed heavy oil was diluted using diesel oil by a 1:1 ratio to acquire the oil sample with a low viscosity.

Compatibility and Stability Tests

Figure 9:
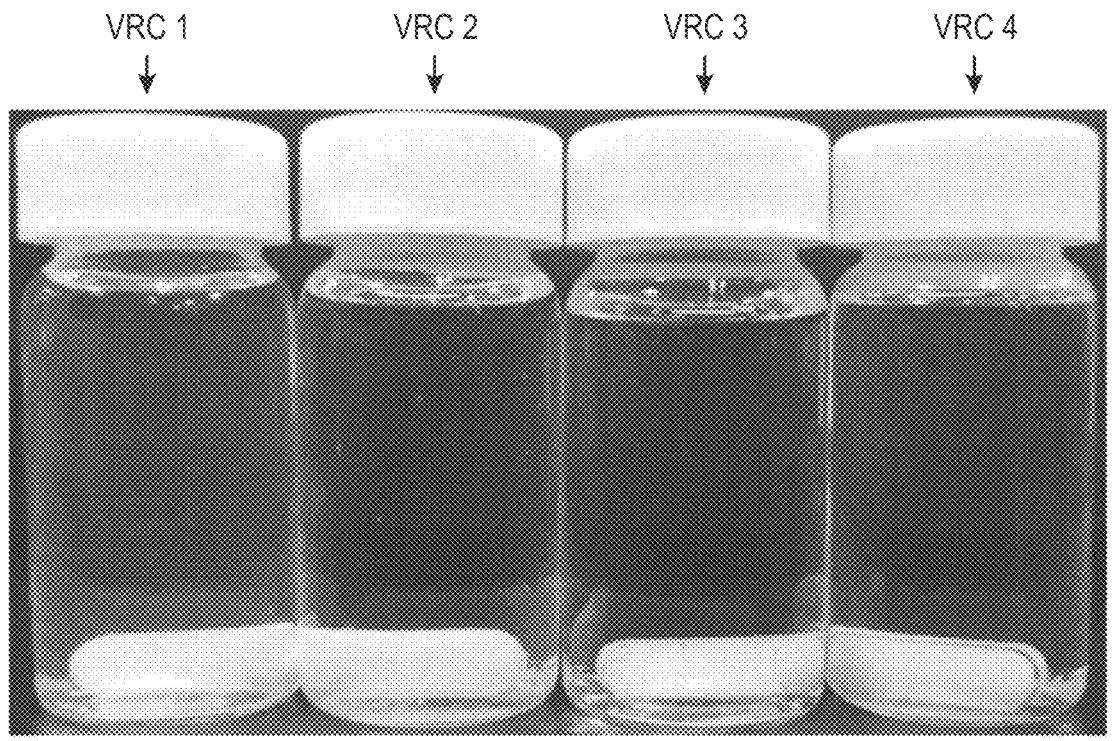
FIG. 9 shows exemplary VRC solutions in synthetic brine at 60° C.

VRC solutions 1-4 were observed visually after preparation at 25° C. and after placing in ovens at 60° C. for several days, respectively. For each of the solutions (VRC 1-4), the insoluble materials were solubilized into surfactant micelles and the VRC solutions were thermally stable and compatible with the reservoir brine (FIG. 9).

Emulsification Test

Figure 10:
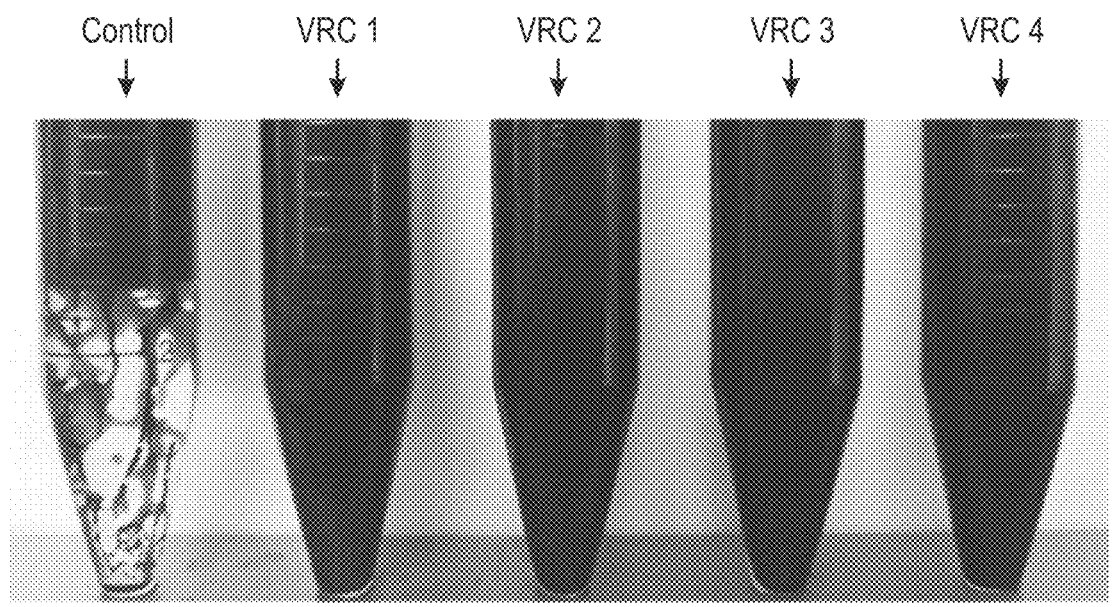
FIG. 10 shows emulsification of heavy crude oil with brine (control) and exemplary VRC solutions.

The heavy oil was mixed with each of VRC solutions 1-4 in centrifuge tubes at an oil-to-water ratio of 1:1, and an oil-water emulsion was generated by fast hand shaking of the tube. The mixtures were placed at 50° C. for 10 min. Formation of an oil-water emulsion was visually is observed in each of VRC solutions 1-4. A stable emulsion will contribute to viscosity reduction of heavy crude oil. FIG. 10 shows that VRC solutions 1-4 were able to form stable emulsions while the control (heavy oil and synthetic reservoir brine solution) did not.

Viscosity Measurements

Figure 11:
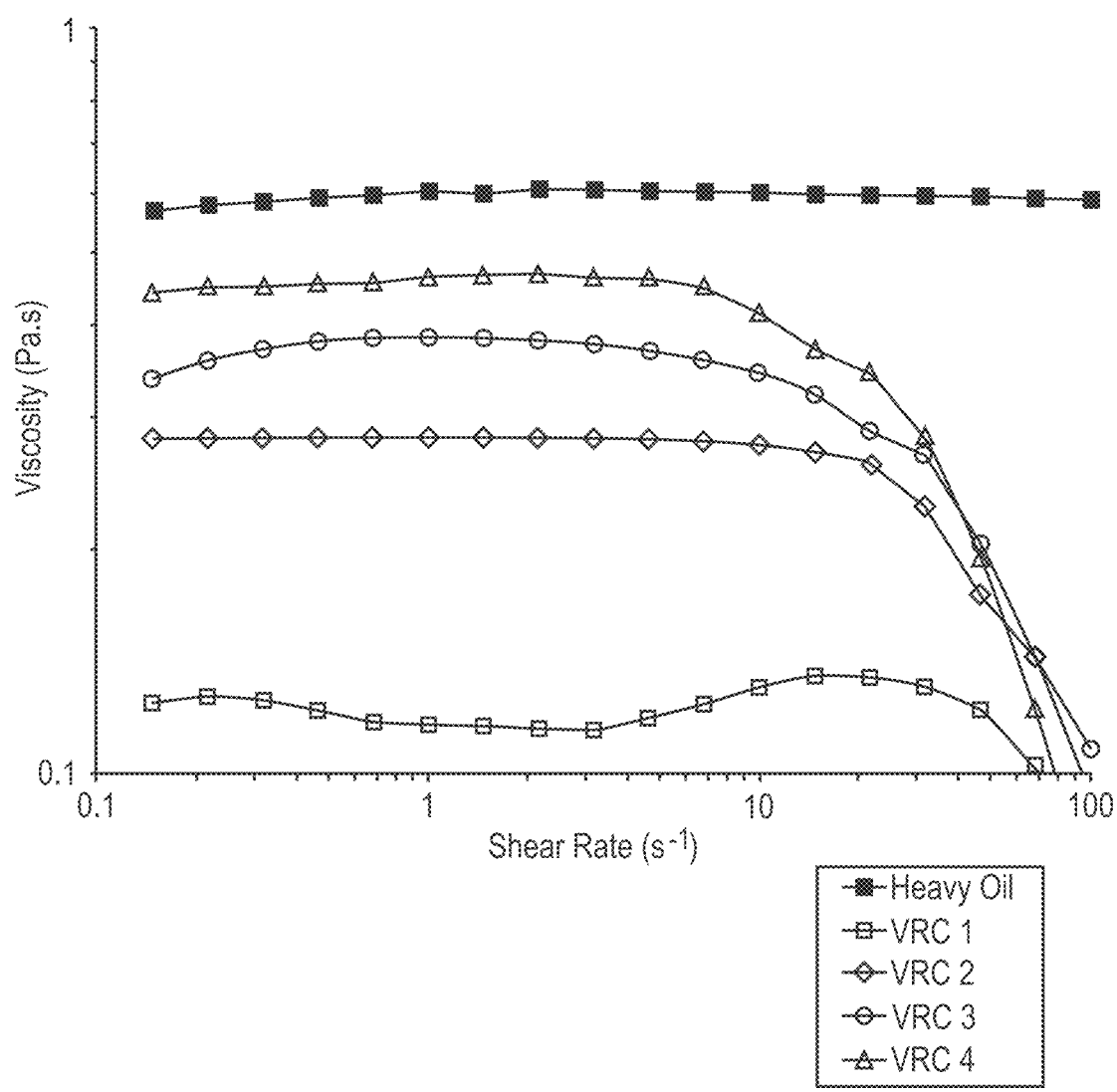
FIG. 11 shows the viscosity versus shear rate of dehydrated and degassed heavy oil and emulsions containing exemplary VRC complexes at 50° C.

VRC solutions 1-4 were mixed with the heavy crude oil at an oil-to-water ratio of 7:3 and the mixtures were stirred at 50° C. for 1 hour to yield the emulsions which were then transferred into a 50° C. oven for stabilization. The viscosity of the oil-water emulsions was determined at 50° C. using a controlled-stress rheometer equipped with a setup of double wall concentric cylinders. The shear rate ranged from 0.1 to 100 s$^{-1}$, where the viscosity value at a shear rate of 6.81 s$^{-1}$ is considered the viscosity of emulsion. The viscosity versus shear rate is shown in FIG. 11 and the viscosity results are listed in Table 2. Before the measurement, a shear rate of 1000 s$^{-1}$ was applied to the sample solution at 50° C. to avoid partial dehydration of the oil-water emulsion.

The viscosity reduction rate ($f_{VR}$) was determined using the following formula, where $\eta_0$ and $\eta_e$ represent viscosities of dehydrated and degassed heavy crude oil and oil-water emulsion, respectively at 50° C.

$$f_{VR} = \frac{\eta_0 - \eta_e}{\eta_0} \times 100\%$$

TABLE 2

Viscosity and $f_{VR}$ of VRC solutions 1-4

| Sample | Viscosity (Pa · s) | $f_{VR}$ (%) |
|---|---|---|
| Heavy oil (control) | 0.603 | — |
| VRC 1 | 0.124 | 79 |
| VRC 2 | 0.281 | 54 |
| VRC 3 | 0.359 | 41 |
| VRC 4 | 0.448 | 26 |

As the results in Table 2 and FIG. 11 indicate, addition of 0.2 wt% (of the total amount of oil and brine) of a VRC solution to heavy crude oil efficiently decreased the viscosity of the heavy oil, with a maximum viscosity reduction rate of about 80%. The heavy oil viscosity reduction increased when using the VCR complexes having higher content of the component A.

Interfacial Properties

Figure 2A:
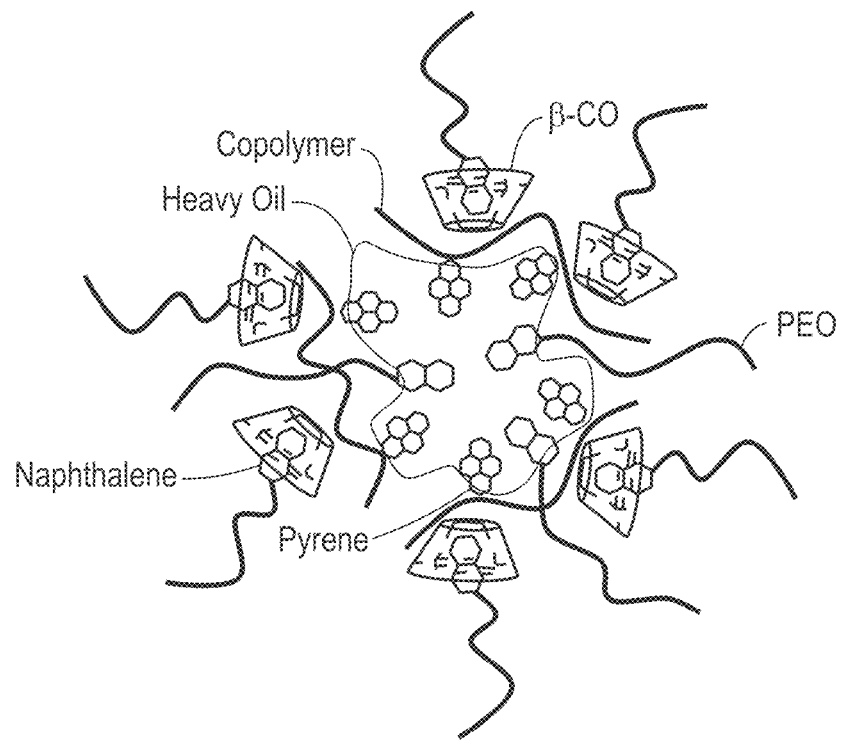
FIGS. 2A-2B illustrate interaction of the viscosity reducer with heavy oil (FIG. 2A) and the asphaltene structure (FIG. 2B) in an aqueous environment.
Figure 2B:
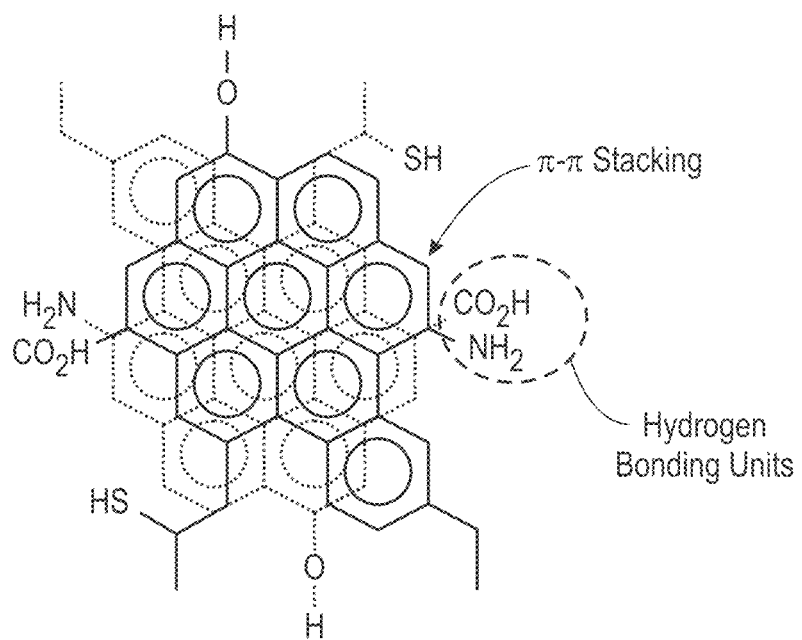
Figure 12A:
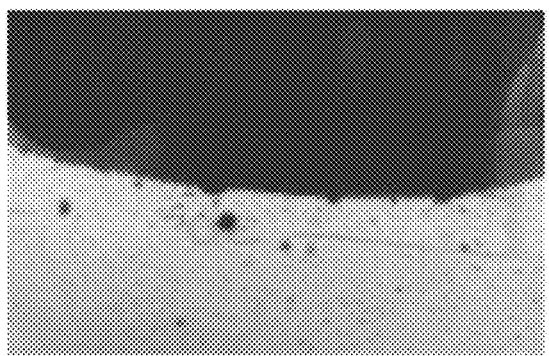
FIGS. 12A-12D show the formation and dispersion of heavy oil droplets into the aqueous phase of exemplary VRC solutions.
Figure 12B:
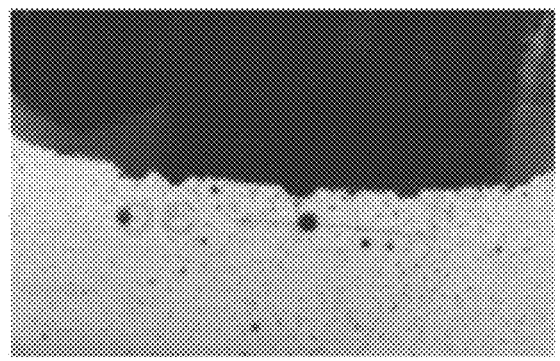
Figure 12C:
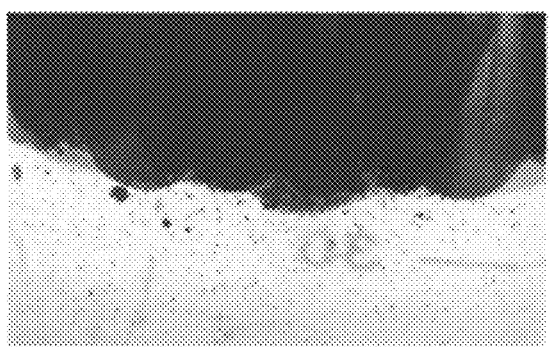
Figure 12D:
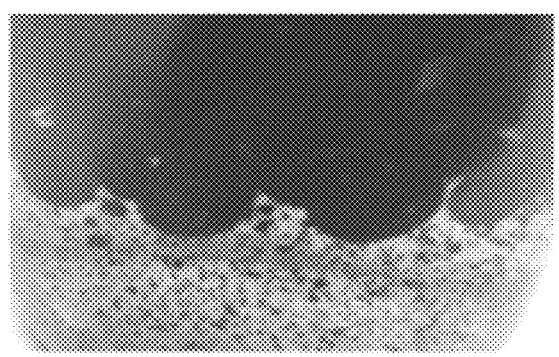

As shown in FIGS. 2A-2B, the hydrophobic groups of component A of the VRC interact with the heavy oil aggregates via π-π stacking, hydrogen bonding, and hydrophobic association. The host molecules are tightly bound to the surface of the heavy oil colloidal particles, and the self-assembled structural points (the β-CD groups) stay inside the aqueous phase. Subsequently, the naphthalene groups as the hydrophobic units of the guest molecules (hydrophilic component B) insert themselves into the cavity of β-CD to form the self-assembled structure, and the hydrophilic PEG chains extend into the aqueous phase towards the outside of the oil droplet to is stabilize the O/W emulsions. The oil block was gradually transferred into dispersive oil droplets. Therefore, the interfacial behavior between oil and water has been significantly changed in the presence of the VRC. The PEG chains of the hydrophilic component B tended to pull the dispersive oil phase into the aqueous phase. The phenomenon was observed from the pictures shown in FIGS. 12A-12D, which depicts the formation and dispersion of heavy oil droplets into the aqueous phase zo for a representative VRC solution of the present disclosure. FIG. 12A shows the chemical solution before self-assembly; FIG. 12B shows the self-assembly beginning to affect the interface; FIG. 12C shows the formation of oil droplets at the interface; and FIG. 12D shows that the oil droplet has been formed and dispersed into the aqueous phase.

The results of the experiments showed that a polyaromatic-hydrocarbon-based water-soluble VRC for heavy crude oil reduced the heavy oil viscosity via the mechanisms of oil-soluble type viscosity reduction. The hydrophobic component of the VRC interacted with heavy crude oil to disperse the bulky oil blocks, while the hydrophilic component self-assembled with the hydrophobic component to enhance the solubility and retained the dispersive status of oil droplet. Additionally, the polyaromatic hydrocarbons interacted with the resin and asphaltene in heavy oil to reduce the intermolecular Van der Waals forces, the dipole forces, and hydrogen bonding between asphaltene molecules, thus the overlapping and stacking structures formed by the aggregated asphaltene collapsed, and the viscosity of the oil decreased accordingly. As a consequence, the viscosity of the heavy oil in the formation and in the lifting process was significantly reduced, thereby improving the exploitation quantity of the heavy oil resources.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:
1. A water-soluble viscosity reducer complex comprising:
   a hydrophobic component that is a tri-polymer comprising acrylamide or an acrylamide derivative, cyclodextrin or a cyclodextrin derivative, and a pyrene-based monomer; and a hydrophilic component comprising a polyaromatic compound and a poly(ethylene glycol) (PEG).

2. The viscosity reducer complex of claim 1, wherein the hydrophobic component and the hydrophilic component self-assemble to form the viscosity reducer complex via a host-guest interaction.

3. The viscosity reducer complex of claim 1, wherein the tri-polymer comprises about 90 wt% to about 95 wt% or about 94 wt% of the acrylamide or an acrylamide derivative.

4. The viscosity reducer complex of claim 1, wherein the tri-polymer comprises about 1 wt% to about 5 wt%, about 2 wt% to about 3 wt%, or about 3 wt% of the cyclodextrin or cyclodextrin derivative.

5. The viscosity reducer complex of claim 1, wherein the cyclodextrin or cyclodextrin derivative is a β-cyclodextrin (β-CD).

6. The viscosity reducer complex of claim 1, wherein the cyclodextrin or cyclodextrin derivative is allyl-β-cyclodextrin.

7. The viscosity reducer complex of claim 1, wherein the tri-polymer comprises about 1 wt% to about 5 wt%, about 2 wt% to about 3 wt%, or about 3 wt% of the pyrene-based monomer.

8. The viscosity reducer complex of claim 1, wherein the pyrene-based monomer is selected from the group consisting of pyrene, methylpyrene, benzo[a]pyrene, pyrenemethanol, pyrenebutanol, pyrenebutyric acid, 1-pyrenemethyl acrylate, and mixtures thereof.

9. The viscosity reducer complex of claim 1, wherein the pyrene-based monomer is 1-pyrenemethyl acrylate.

10. The viscosity reducer complex of claim 1, wherein the tri-polymer is acrylamide:allyl-β-cyclodextrin:1-pyrenemethyl acrylate.

11. The viscosity reducer complex of claim 10, wherein the tri-polymer has a molar ratio of 94:3:3 of the acrylamide: allyl-β-cyclodextrin:1-pyrenemethyl acrylate.

12. The viscosity reducer complex of claim 1, wherein the polyaromatic compound is naphthalene or a derivative thereof.

13. The viscosity reducer complex of claim 1, wherein the molecular weight of the PEG is about 1,000 g/mol to about 5,000 g/mol or about 2,000 g/mol.

14. A composition, comprising:
an aqueous solution; and
a water-soluble viscosity reducer complex comprising:
a hydrophobic component that is a tri-polymer comprising acrylamide or an acrylamide derivative, cyclodextrin or a cyclodextrin derivative, and a pyrene-based monomer; and
a hydrophilic component comprising a polyaromatic compound and a poly(ethylene glycol) (PEG).

15. The composition of claim 14, wherein the aqueous solution is reservoir brine.

16. The composition of claim 14, wherein the hydrophobic component and the hydrophilic component self-assemble in the aqueous solution to form the viscosity reducer complex.

17. The composition of claim 14, wherein the hydrophobic component is about 0.3 wt% to about 0.6 wt% of the aqueous solution and the hydrophilic component is about 0.3 wt% to about 0.6 wt% of the aqueous solution.

18. The composition of claim 14, wherein the hydrophobic component is the tri-polymer acrylamide:allyl-β-cyclodextrin:1-pyrenemethyl acrylate.

19. The composition of claim 14, wherein the hydrophilic component is naphthalene-PEG.

20. A method of reducing the viscosity of heavy crude oil, comprising adding a composition comprising a water-soluble viscosity reducer complex to heavy crude oil in an amount sufficient to reduce the viscosity of the heavy crude oil, wherein the viscosity reducer complex comprises:
a hydrophobic component that is a tri-polymer comprising acrylamide or an acrylamide derivative, cyclodextrin or a cyclodextrin derivative, and a pyrene-based monomer; and
a hydrophilic component comprising a polyaromatic compound and a poly(ethylene glycol) (PEG).

21. The method of claim 20, wherein the composition comprising the water-soluble viscosity reducer complex further comprises an aqueous solution.

22. The method of claim 21, wherein the aqueous solution is reservoir brine.

23. The method of claim 20, wherein the viscosity reducer complex interacts with an asphaltene in the heavy oil to solubilize the asphaltene aggregates.

24. The method of claim 23, wherein the solubilized asphaltene aggregates form an oil-in-water emulsion.

* * * * *